US006886632B2

(12) United States Patent
Raghuraman et al.

(10) Patent No.: US 6,886,632 B2
(45) Date of Patent: May 3, 2005

(54) ESTIMATING FORMATION PROPERTIES IN INTER-WELL REGIONS BY MONITORING SATURATION AND SALINITY FRONT ARRIVALS

(75) Inventors: Bhavani Raghuraman, Wilton, CT (US); Francois M. Auzerais, Westport, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 88 days.

(21) Appl. No.: 10/197,953

(22) Filed: Jul. 17, 2002

(65) Prior Publication Data

US 2004/0011524 A1 Jan. 22, 2004

(51) Int. Cl.[7] .......................... E21B 47/00; E21B 47/06
(52) U.S. Cl. .................. 166/252.4; 166/64; 166/252.3; 166/254.2; 73/152.41; 73/152.42
(58) Field of Search ............................ 166/245, 250.01, 166/252.1, 252.3, 252.4, 254.1, 254.2, 250.03, 268, 305.1, 369, 64; 73/152.12, 152.29, 152.39, 152.41, 152.42

(56) References Cited

U.S. PATENT DOCUMENTS

| | | | | |
|---|---|---|---|---|
| 3,393,735 A | * | 7/1968 | Altamira et al. | 166/245 |
| 3,944,910 A | | 3/1976 | Rau | 324/6 |
| 4,052,893 A | * | 10/1977 | Murphy et al. | 73/152.08 |
| 4,085,798 A | * | 4/1978 | Schweitzer et al. | 166/252.4 |
| 4,102,396 A | * | 7/1978 | Ransom et al. | 166/252.2 |
| 4,399,359 A | * | 8/1983 | Fertl et al. | 250/269.6 |
| 4,687,057 A | * | 8/1987 | Moore et al. | 166/252.3 |
| 4,704,581 A | | 11/1987 | Clark | 324/341 |
| 5,214,384 A | * | 5/1993 | Sprunt et al. | 324/351 |
| 5,467,823 A | | 11/1995 | Babour et al. | 166/250.01 |
| 5,497,321 A | | 3/1996 | Ramakrishnan et al. | 364/422 |
| 5,642,051 A | | 6/1997 | Babour et al. | 324/357 |
| 6,182,013 B1 | | 1/2001 | Malinverno et al. | 702/7 |
| 6,588,266 B2 | * | 7/2003 | Tubel et al. | 73/152.39 |
| 6,615,917 B2 | * | 9/2003 | Bussear et al. | 166/250.15 |
| 2002/0027004 A1 | * | 3/2002 | Bussear et al. | 166/250.15 |
| 2002/0046836 A1 | * | 4/2002 | Pereira et al. | 166/254.2 |

OTHER PUBLICATIONS

Schlumberger, "Log Interpretation Principles/Applications", Mar. 1998, pp. 2–5 and 7–1 through 7–2.*
Ellis, D.V. "Well Logging for Earth Scientists", *Elsevier* (1997).
Pederson, L. et al. "Seismic Snapshots for Reservoir Monitoring", *Schlumberger Oil Review*, vol. 8, pp. 32–43 (1996).
Ramakrishnan, T. S. et al. "Water Cut and Fractional Flow Logs from Array Induction Measurements". *SPE Reservoir Eval. & Eng.*, vol. 2, pp. 85–94 (1999).
"Schlumberger Log Interpretation Principles/Applications", *Schlumberger Educational Services*, Chapter 9, pp. 126–137 (1987).

* cited by examiner

*Primary Examiner*—David Bagnell
*Assistant Examiner*—Jennifer H Gay
(74) *Attorney, Agent, or Firm*—Jody Lynn DeStefanis; William B. Batzer; Dale Gaudier

(57) ABSTRACT

A method and system of monitoring the movement of at least one front in an inter-well region is comprised of: providing a first well representing the origination of at least one front (such as a saturation front or a salinity front); providing one or more monitoring locations, each equipped with at least one sensor; and monitoring the arrival of at least one front at one or more monitoring locations. The origination well may be any type of permanent or temporary well, but is preferably an injector well. Likewise, the monitoring location(s) may be any type of permanent or temporary well such as an observation well, a production well, an exploratory well, and an appraisal well. Information regarding front arrival times may be used to characterize or appraise the formation. Front arrivals may be monitored as a function of time to develop their respective time evolution and shape.

39 Claims, 4 Drawing Sheets

ESTIMATING FORMATION PROPERTIES IN INTER-WELL REGIONS BY MONITORING SATURATION AND SALINITY FRONT ARRIVALS

FIELD OF THE INVENTION

The present invention relates to methods for determining effective formation properties in the inter-well region by using measurements from sensors in monitoring locations (i.e., observation wells or producing wells, or other type of well) and, more particularly, to methods for estimating effective porosity, connate water saturation, residual oil saturation and relative permeability curves over inter-well regions of the reservoir by tracking arrival times of oil-water saturation front and salinity front.

BACKGROUND OF THE INVENTION

Estimation of formation properties is crucial to successful reservoir production and management. Reservoir simulators typically divide the reservoir into grid blocks and use finite difference techniques to model fluid flow in the reservoir. They require formation property and initial condition input for each grid cell. However, formation properties estimated from log data are valid only in the near wellbore region on the order of a few feet and are a one-time measurement immediately after drilling. To populate the simulator grid blocks in the regions between wells, these local properties are interpolated. For heterogeneous reservoirs, such interpolation using sparse local data leads to erroneous predictions of reservoir performance. In order to predict fluid movement in the reservoir accurately and control it, these formation properties must be known in both the local and reservoir scale. Drilling monitoring wells (such as observation wells, producing wells, exploratory wells, etc.) and instrumenting them with permanent sensors (or sensors in pseudo-permanent temporary wells), in accordance with the present invention, allows data collection over the life of the reservoir. Preferably, the location of one or more wells should be in regions of the reservoir where there is least information available or there is large heterogeneity and uncertainty in formation properties.

Conventional methods for formation characterization use various well logs and core analysis to estimate formation properties such as porosity, density, mineralogy, etc. Resistivity logs that make shallow and deep measurements are used to estimate water saturation. Invasion of mud filtrate into the formation during drilling results in salinity and saturation fronts in the near wellbore region. The separation between the two fronts depends on connate water saturation, irreducible water saturation and maximum residual oil saturation. Further, the velocities of the fronts depend on the above parameters as well as the total flow rate (filtrate loss) and porosity. The existence of these two fronts causes radial resistivity variation in the near wellbore region which is measured by array induction logs. By using the array induction log measurements and log interpreted porosity, Ramakrishnan and Wilkinson were able to invert for the total filtrate loss, local connate water, irreducible water and maximum residual oil saturations as disclosed in "Water Cut and Fractional Flow Logs from Array Induction Measurements" SPE Reservoir Eval. & Eng. 2, 1999, pages 85–94 and commonly owned U.S. Pat. No. 5,497,321 (the '321 Patent) to Ramakrishnan and Wilkinson. From this information, the residual oil saturation and relative permeability curves for the local near wellbore region may be estimated. While the method of the '321 Patent is effective in the near wellbore region, its usefulness is limited in the inter-well region. The Ramakrishnan and Wilkinson article and the '321 Patent are incorporated herein by reference in their entireties.

In recent years, permanent monitoring technology has seen rapid progress as a key to improved reservoir understanding and management. Resistivity arrays permanently installed in producing and observation wells are being used as sensors to detect the arrival of the oil-water saturation front, such as that disclosed in commonly owned U.S. Pat. No. 5,642,051 to Babour et al. (the '051 Patent). Voltages at the array electrodes are monitored continuously and changes in these voltages are interpreted as saturation changes due to oil-water front movement tens of feet into the formation. Permanently installed pressure gauges that are hydraulically isolated from the well but in communication with the formation can track formation pressure as disclosed in commonly owned U.S. Pat. No. 5,467,823 to Babour et al. (the '823 Patent). The '051 and '823 Patents are incorporated herein by reference in their entireties.

Commonly owned U.S. Pat. No. 6,182,013 (the '013 Patent) to Malinverno et al. relates to a method and apparatus to dynamically map the location of an oil-water saturation front and to predict its movement over time by combining permanent resistivity array and pressure measurements obtained from apparatus and methods described in the '051 and '823 Patents. The '013 Patent discloses the ability to monitor the movement of a saturation front into a formation by characterizing the formation over a finite distance into the formation at one instance in time; it does not disclose the ability to track arrival time for one or more fronts in a monitoring location. The '013 Patent is incorporated by reference herein in its entirety.

It is therefore an object of the present invention to provide a methodology to provide a method and apparatus to monitor the arrival of at least one front (i.e., a saturation front and a salinity front) to assist in the characterization of formation properties in the inter-well region.

It is a further object of the present invention to estimate effective porosity, connate water saturation, residual oil saturation and relative permeability curves for the inter-well region by monitoring the arrival of both oil-water saturation and water salinity fronts by using permanent resistivity arrays in monitoring locations.

It is another object of the present invention to increase the robustness of the interpretation by using a permanent pressure gauge and/or permanent geophones (time-lapse seismic) together with a permanent resistivity array to independently track arrival/movement of oil-water saturation front.

It is yet another object of the present invention to increase the inversion robustness by independent tracking of the salinity front using a permanent salinity sensor (i.e., dielectric or surface salinity sensors) at the monitoring location.

SUMMARY OF THE INVENTION

While tracking the oil-water saturation front allows characterization of the formation, a more detailed and improved characterization is possible, in accordance with the present invention, if the water salinity front movement is also tracked together with the oil-water saturation front in the formation. The salinity front results when the injected water salinity is different from the formation water salinity. Tracking the arrival of both fronts at a monitoring location (such as an observation well or a production well, etc.) will allow estimation of effective properties in the inter-well region (between the origination well and the monitoring well) such as porosity, connate water saturation, residual oil saturation and relative permeability curves. Information for inversion is contained both in the separation of the two fronts as well as in the shape of the water saturation curve as it evolves at the monitoring location over time. Such methods will allow more robust appraisal of the formation.

In accordance with the present invention, changes in water salinity and the saturation may be monitored as a function of time at a fixed location. Monitoring the arrival of these fronts (saturation front alone or with the salinity front) allows determination of various formation properties in the inter-well region.

In one embodiment, a method of monitoring the movement of at least one front in an inter-well region is disclosed comprising: providing a first well representing the origination of at least one front; providing one or more monitoring locations, each equipped with at least one sensor; and monitoring the arrival of at least one front at one or more monitoring locations. Preferably, the first well has a fluid at a first salinity and one or more monitoring locations are in a formation having a formation fluid at a second salinity different from the first salinity. Further, it is preferable to monitor at least one salinity front and at least one saturation front.

The time between each front arrival may be monitored and a forward model of the formation may be developed, such as an electrostatic field model or a multiphase fluid flow model.

The first (origination) well may be any type of well, but is preferably an injector well. Likewise, the monitoring locations may be any type of well, but are preferably selected from the group consisting of an observation well, a production well, an exploratory well, and an appraisal well and combinations thereof. Further, the origination well and/or the monitoring location may be a vertical well, a horizontal well, or a deviated well.

The sensor at the monitoring location is preferably an electrical resistivity array (ERA) that may be permanently or temporarily installed (such as incorporated in a testing string). Likewise, the monitoring locations may be permanently or temporarily installed for a time period sufficient to measure the movement of fronts in the inter-well region.

The disclosed method may be used to estimate formation characteristics based on the measured arrival time of each front, including porosity, connate water saturation, irreducible water saturation, shape of the permeability curve, maximum residual oil saturation and combinations thereof. Further, the front arrival(s) may be monitored as a function of time, for example, to monitor the rate of change of water saturation and to develop a model of the time evolution of a front. Time dependent information may be plotted, such as to invert the shape of the permeability curve. Using an ERA, the different front arrivals (including the time evolution and rate of change of water saturation) may be monitored as a function of time for different positions along an array at a given monitoring location to provide information regarding the heterogeneity of the formation. This characterization may be made for any type of vertical well, horizontal well or deviated well.

A second embodiment discloses a system to monitor the movement of at least one front in an inter-well region, comprised of a first well representing the origination of at least one front; and one or more monitoring locations, each equipped with at least one sensor, wherein at least one sensor is capable of monitoring the arrival of at least one front. The system may further include additional sensors such as salinity sensors, pressure sensors, 4D seismic sensors and combinations thereof.

Further features and applications of the present invention will become more readily apparent from the figures and detailed description that follows.

DETAILED DESCRIPTION

Figure 1:
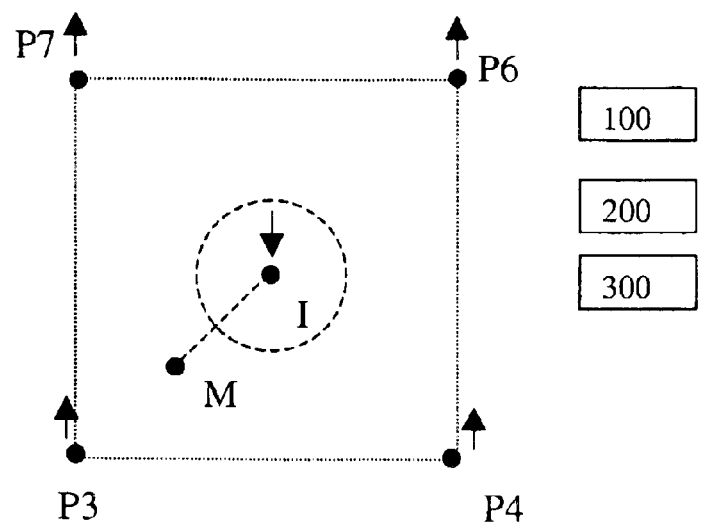
FIG. 1 is a schematic of a typical five spot flooding pattern used to model the present invention.

FIG. 1 diagrams a typical five spot flooding pattern with a 15 foot thick pay zone and a permeability of about 70 mD. This configuration is used to explain the present invention and is intended to be non-limiting. One skilled in the art would recognize that additional configurations may be suitably employed.

As shown in the non-limiting model configuration of FIG. 1, a monitoring well with a permanently installed resistivity array may be drilled between an injector well (I) and a producer wells (P3, P4, P6 and P7). By way of example, the monitoring well (M) is shown halfway between I and P3; the actual number, type and location of the origination well (i.e. injector) and the monitoring locations may differ depending on the reservoir characteristics. The monitoring location may be an observation well, an appraisal well, a producing well or an exploratory well (or any combination of these wells). Well logs and core analysis at these two wells can give information about the formation in the near wellbore region. The array induction logs may be interpreted to get local connate water, maximum residual oil and irreducible water saturations, which can then be used to calculate the residual oil and relative permeability functions for the local near-wellbore region.

Based on these log interpretations, an estimate of local formation properties at the two wells may be developed. However, if there is a significant difference between the two logs, there is no consistent way to populate the simulator grid blocks in the inter-well region. For example, the porosity at the injector well and the observation well may be known, but if they vary then there is no way of knowing the porosity in the region between the wells. It is the effective porosity in this inter-well region that control fluid movement and erroneous interpolation or upscaling could lead to uncertainties in effective pore volume in this region. Small errors in porosity over large volumes could result in a significant error in pore volume.

Interpreting Permanent Resistivity Sensor Measurements

Figure 2:
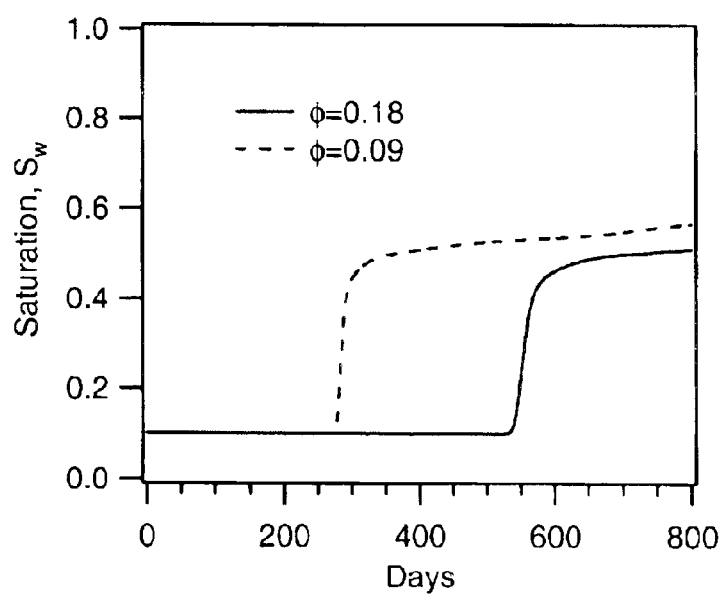
FIG. 2 is a graphical representation of the sensitivity of a resistivity array in a monitoring location to effective porosity in the inter-well region.

The arrival of the saturation front at the observation well in accordance with the present invention is detected by monitoring voltage changes in an electrical resistivity array (ERA) mounted at the sensing (observation or production) well. By assuming a uniform connate water and residual oil saturation value in the inter-well flow region (such as that determined from well logs at the injector well), arrival times may be interpreted in terms of effective porosity as shown in FIG. 2.

A lower effective porosity causes the front to arrive earlier relative to a higher effective porosity formation. However, if the connate water saturation and residual oil saturation varies in this region, then the effective porosity cannot be estimated from the front arrival time alone. To get the true effective porosity, joint (or simultaneous) inversion for effective porosity, connate water and residual oil saturation should preferably be done. One embodiment of the present invention provides for such a joint inversion by monitoring the arrival of both the saturation front and the salinity front.

Figure 3A:
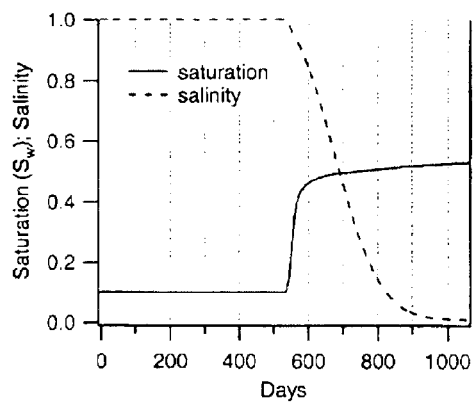
FIGS. 3a and 3b are graphical representations of the sensitivity of a resistivity array to effective connate water saturation in the inter-well region where connate water saturation is 10% in FIG. 3a and connate water saturation is 40% in FIG. 3b.
Figure 3B:
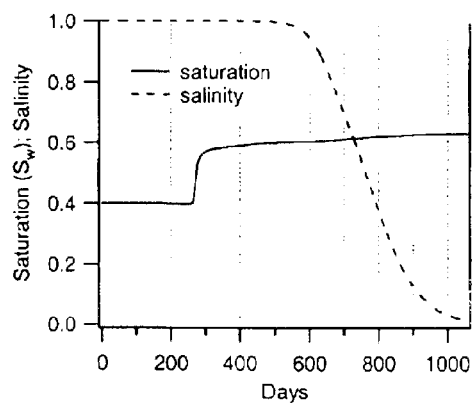

FIGS. 3a and 3b compare two cases with equal effective porosity (in this case 18%) and equal effective residual oil saturation (35%). The injected water salinity is 1% of the formation water salinity. For both cases, the effective connate water is the effective irreducible water saturation. In case (a) however, the effective connate water saturation is 10%, while in case (b) it is 40%. There are two kinds of displacements taking place in the reservoir. One is the water displacing movable oil giving rise to an oil-water saturation front. The second kind of displacement involves injected salt water mixing with formation water of a different salinity, giving rise to a salinity front. The injected salt water should equilibrate to the same pore volume of formation water in both cases, as the residual oil saturation is equal in both cases. Accordingly, as seen in FIGS. 3a and 3b, the salinity front arrives at about the same time in the observation well for both cases. The oil-water front, however, arrives earlier in case (b) because there is less oil to be displaced in case (b). Note that less oil is present in case (b) because there is more connate water present. Oil displaced in case (a) is 55% (65 minus 10) of the pore volume, while for case (b) it is 25% (65 minus 40) of pore volume. This scenario causes an increased separation of the saturation and salinity fronts, as shown in FIG. 3b.

Figure 4A:
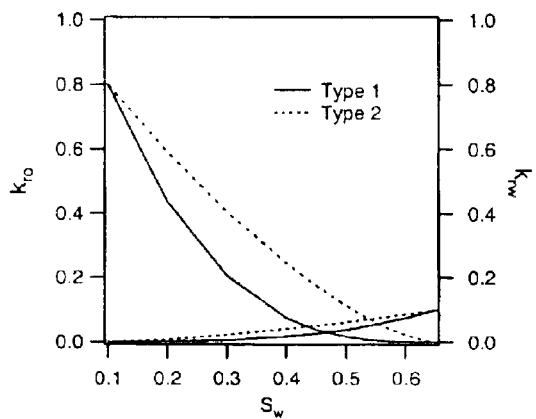
FIGS. 4a and 4b are graphical representations of the sensitivity of a resistivity array to the shape of a permeability curve.
Figure 4B:
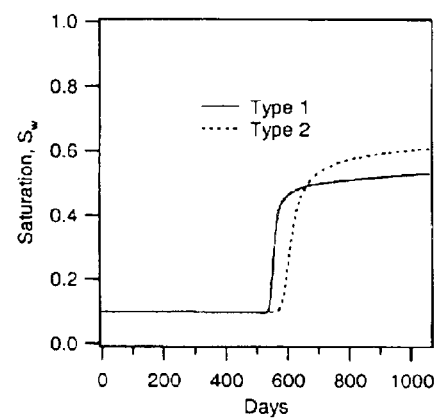

Additional information may be obtained by monitoring the rate of change of the saturation at the observation well. FIG. 4a shows two different sets of relative permeability functions, labeled Type 1 and Type 2. FIG. 4b shows how relative permeability affects the rate of change in saturation at the observation well at breakthrough. Type 1 relative permeability curves are more non-linear as reflected by a steeper saturation rate change curve shown in FIG. 4b. At a water saturation greater than 50%, the oil mobility is much higher for Type 2 than Type 1 as reflected by the quicker rise to flooded water saturation (residual oil) in FIG. 4b for Type 2. Thus, by monitoring the rate of change in water saturation at the well, information regarding the shape of the relative permeability curves may be obtained. However, it should be noted that if the displacement distance between the injector well and the observation well is larger (on the order of hundreds of feet), the shape of the saturation curve may be distorted by dispersion due to small-scale heterogeneities. For thin horizontal beds and situations where observations wells are close to the injector well (on the order of tens of feet), the shape of the saturation curve will be retained and not become distorted. Using this data the shape of one or more fronts may be plotted.

Changes in resistivity in the near wellbore region due to changes in saturation and salinity of water causes changes in voltages and currents in the resistivity array electrode. Resistivity array measurements are sensitive to effective formation properties in the flow region, such as porosity, connate water saturation and shape of the relative permeability curve. These properties are not independent of each other. For example, the relative permeability curve may be parameterized as a function of connate water saturation, irreducible water saturation and maximum residual oil saturation as disclosed in the '321 Patent. The inverse problem is accordingly formulated to estimate the effective porosity and the relative permeability parameters (irreducible water, connate water and maximum residual oil saturations) given the total injected flow for that time period. Once the relative permeability parameters are obtained, the residual oil and relative permeability curves can be calculated.

As shown in FIG. 1, a data acquisition and control system 100, means to develop a model of the time evolution of at least one front 200, and means to plot the time evolution of at least one saturation front 300 may be suitably employed to assist in the collection and processing of data collected by the sensor(s).

Further, the sensors may be configured in an array such that changes in voltages and currents occur in different electrodes along the array of the monitoring well as the front(s) arrives. Such differential response of the electrodes allows for determination of the heterogeneity of the formation. This analysis may be made for any type of vertical well, horizontal well or deviated well.

Inversion Algorithm

The proposed inversion algorithm is a least squares minimization of the differences between observed voltages measured over time and predicted voltages (obtained using a reservoir simulator and an electrostatic code) to yield estimates of the effective porosity and relative permeability parameters (connate water saturation, irreducible water saturation and maximum residual oil saturation) for a known injection flow rate. The range of the estimated properties would be constrained by the information available from local data points (i.e., well logs) and other prior knowledge. Once the relative permeability parameters are known, the residual oil saturation and relative permeability functions may be estimated.

The inversion methodology disclosed in commonly owned U.S. Pat. No. 5,497,321 (the '321 Patent) to Ramakrishnan and Wilkinson (incorporated herein by reference in its entirety) uses an array induction log data collected over a radial distance on the order of a few feet near the wellbore but at one instance in time (while logging). The estimated properties are valid locally in this near wellbore. In accordance with the present invention, the inversion may be performed from data collected at one location (i.e., the monitoring location) but continuously over the entire time of production (rather than at only one instance in time as in the '321 Patent). The estimated parameters are effective properties for the entire region across which the flow occurred during that time frame and are on the reservoir length scale.

Figure 5:
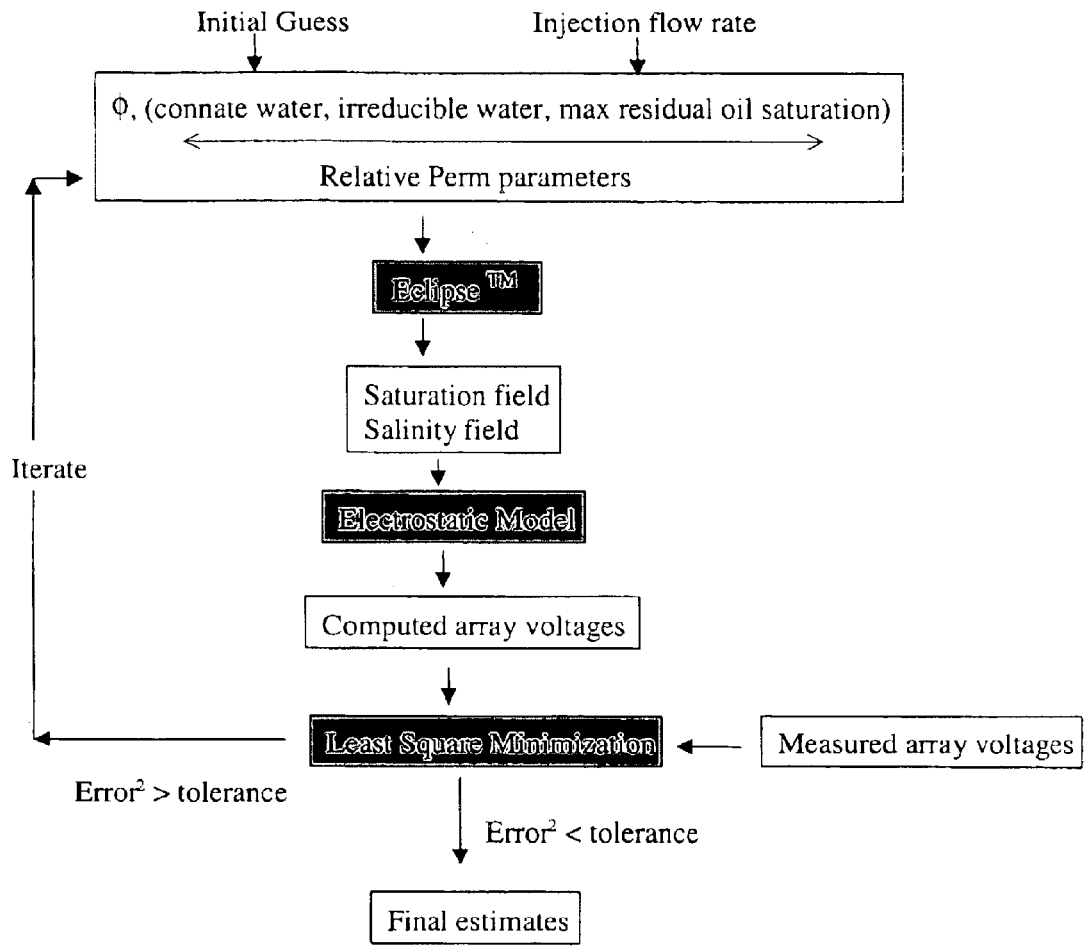
FIG. 5 is a flow chart for the inversion algorithm of the present invention.

FIG. 5 depicts a flow chart or an inversion methodology using a least square minimization algorithm in accordance with the present invention. In accordance with this method, the parameters to be estimated are the effective porosity and the relative permeability parameters (connate water saturation, irreducible water saturation, and maximum residual oil saturation). An initial guess is obtained from well logs and core analysis and any other prior knowledge of the reservoir. This information is input into a multiphase flow simulator such as Eclipse™, developed by Schlumberger (preferably with the brine tracking option). The saturations and salinities output for each grid cell are then input into an electrostatic model to compute the resistivities and predict the voltages at the electrodes in the permanent resistivity array in the observation well. This data is compared to the actual measured values. A least squares minimization algorithm (such as the Levenberg Marquardt algorithm) can be used to get a final estimate of these properties.

Combining Resistivity Array with Other Permanent Sensors

The inversion methodology described above uses the voltage response of the array to track the arrival of the saturation and salt fronts. Interpreting voltages from resistivity arrays preferably includes two forward models: one for the electrostatic field and another for the multiphase fluid flow. This includes the knowledge of additional formation parameters such as in the saturation-resistivity equations (cementation exponent, saturation exponent, clay, etc.). Further, when the two fronts are far apart, as in FIG. 3b, the array response can easily distinguish between the arrival of the two fronts. However, if the fronts overlap as in FIG. 3b or dispersion effects are significant and the front is broad, the inversion could become difficult. Combining the resistivity array sensor with permanent sensors such as for pressure and/or 4D seismic monitoring may increase the robustness of inversion. Further, if a salinity sensor is deployed, then the salinity front could be separately tracked. Independent tracking of the two fronts will reduce uncertainties in data interpretation.

Figure 6:
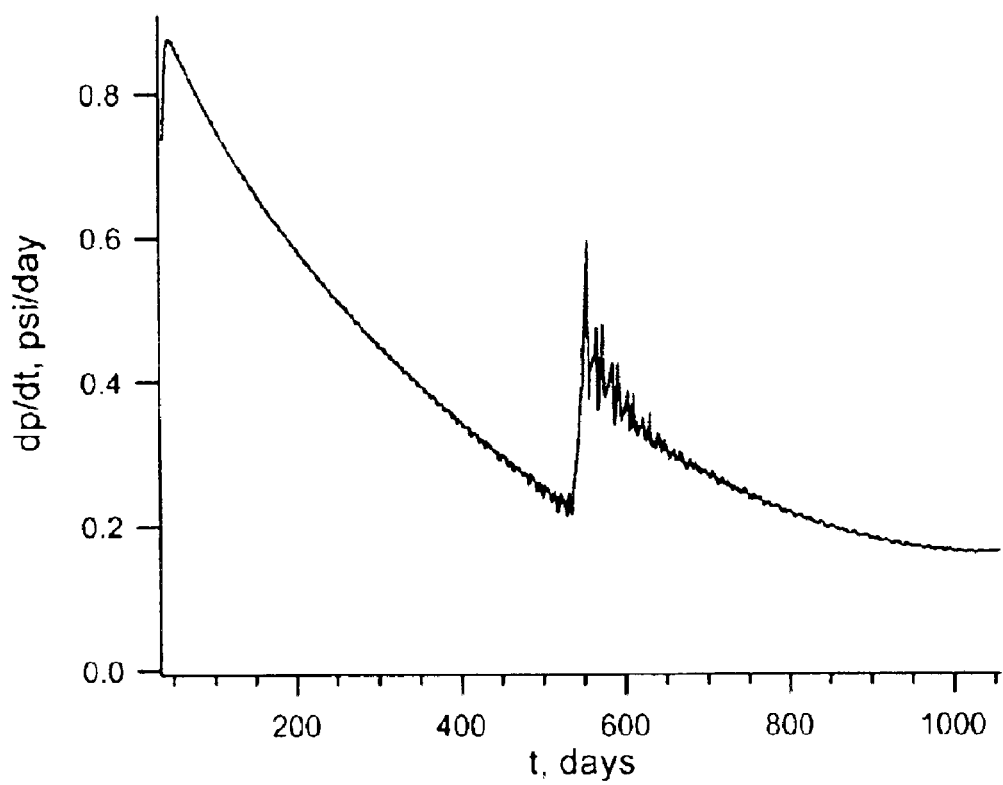
FIG. 6 is a graphical representation of the tracking of an oil-water front arrival by pressure monitoring at a monitoring location.

Permanent pressure gauges deployed in wells may be used to get absolute and relative permeability information about the reservoir in inter-well regions by continuously measuring pressure changes and by repeat transient well tests. When mobilities for water and oil are different, the pressure sensor can track the movement of the oil-water front. FIG. 6 shows a plot of pressure derivative (dp/dt) against time where t is the time and (dp/dt) is the time derivative of pressure recorded at the observation well for the same reservoir conditions used in FIG. 3a with a mobility ratio of about 0.42. The oil-water front passes the observation well at 540 days and this is clearly indicated by the spike in the pressure derivative plot in FIG. 6 at that time.

Permanent geophones installed in observation wells are also deployed to track oil-water saturation front movement on field scales as fluid changes in the reservoir alter the formation's seismic velocity and density and therefore change the attributes of reflected seismic waves. Time lapse seismic monitoring combined with resistivity sensor data improves interpretation accuracy.

The two sensors described above allow independent means of tracking oil-water front movement. However, the interpretation of voltage changes in the array preferably includes knowledge of formation water salinity, which could vary with time. Installing a permanent surface/downhole salinity sensor would allow the tracking of changes in formation water salinity as well as monitor the arrival of the salinity front. This is extremely useful in cases where the oil-water and salinity fronts overlap as in FIG. 3a. A permanently installed downhole dielectric permittivity sensor (working on the principle of the electromagnetic propagation tool (EPT), described in commonly owned U.S. Pat. Nos. 3,944,910 and 4,704,581 (incorporated herein by reference in its entirety)) can be used to obtain the water saturation and salinity in the shallow wellbore region. For cased monitoring locations, it is preferable to use casing materials including insulating material such as fiberglass so that the dielectric sensor may work through the casing.

The origination location (i.e. the injector well) and the monitoring locations may be installed permanently or temporarily. Likewise, sensors may be installed permanently or temporarily (such as incorporated in a testing string).

The above described methods and apparatuses may be applied to formation characterization for appraisal as well as characterization purposes.

While the invention has been described herein with reference to certain examples and embodiments, it will be evident that various modifications and changes may be made to the embodiments described above without departing from the scope and spirit of the invention as set forth in the claims.

We claim:

1. A method of estimating formation characteristics of an inter-well region, comprising:
   a. providing a first well representing the origination of at least one salinity front and at least one saturation front;
   b. providing one or more monitoring locations, each equipped with at least one electrical resistivity array (ERA); and
   c. monitoring the arrival of said at least one salinity front and said at least one saturation front at one or more monitoring locations using said ERA as a function of time; and
   d. determining at least one formation characteristic of the inter-well region based on the joint inversion of the relative arrival times of said at least one salinity front and said at least one saturation front measured in (c), wherein said at least one formation characteristic is selected from the group consisting of effective porosity, residual oil saturation, and connate water saturation, and wherein said at least one salinity front and said at least one salinity front are monitored at at least one common monitoring location.

2. The method of claim 1, wherein said first well has a fluid at a first salinity and wherein one or more monitoring locations are in a formation having a formation fluid at a second salinity different from said first salinity.

3. The method of claim 1, further comprising calculating the time between representative points on each front arrival.

4. The method of claim 3, further comprising developing a forward model of the formation.

5. The method of claim 4, wherein said forward model includes a model for the electrostatic field.

6. The method of claim 4, wherein said forward model includes a model for the multiphase fluid flow.

7. The method of claim 1, further including monitoring the rate of change of water saturation for at least one saturation front.

8. The method of claim 7, wherein said step of monitoring the rate of change of water saturation includes developing a model of the time evolution of at least one front.

9. The method of claim 8, further comprising plotting the time evolution of at least one saturation front.

10. The method of claim 1, further comprising monitoring the arrival of at least one front as a function of time for different positions along at least one electrical resistivity array.

11. The method of claim 1, further comprising monitoring the rate of change of water saturation as a function of time for different positions along at least one electrical resistivity array.

12. The method of claim 1, wherein said first well is an injector well.

13. The method of claim 12, wherein said monitoring location is selected from the group consisting of an observation well, a production well, an exploratory well, and an appraisal well and combinations thereof.

14. The method of claim 1, wherein said ERA is permanently installed.

15. The method of claim 1, wherein said ERA is temporarily installed.

16. The method of claim 15, wherein said ERA is incorporated in a testing string.

17. The method of claim 1, wherein one or more monitoring locations are temporarily installed for a time period sufficient to measure the movement of fronts in said inter-well region.

18. The method of claim 17, wherein said first well is temporarily installed for a time period sufficient to measure the movement of fronts in said inter-well region.

19. The method of claim 9, further comprising jointly inverting the data of (c) and the time evolution data to determine at least one formation characteristic of the inter-well region, wherein said formation characteristic is selected from the group consisting of effective porosity, residual oil saturation, connate water saturation, and relative permeability parameters.

20. The method of claim 19, wherein inverting the data of (c) and the time evolution data includes using a least square minimization algorithm.

21. The method of claim 19, wherein the relative permeability parameters are connate water saturation, irreducible water saturation, and maximum residual oil saturation.

22. The method of claim 1, further comprising obtaining pressure, seismic, or salinity data and jointly inverting the data of (c) with the pressure, seismic or salinity data.

23. A system to estimate formation characteristics of an inter-well region, comprised of:
  a. a first well representing the origination of at least one salinity front and at least one saturation front;
  b. one or more monitoring locations, each equipped with at least one electrical resistivity array (ERA) capable of monitoring the arrival of said at least one salinity front and said at least one saturation front as a function of time; and
  c. a data acquisition and control system to collect and process sensor data to determine the arrival times of the at least one saturation front and the at least one salinity front, wherein said at least one saturation front and said at least one salinity front are monitored at at least one common location, and to jointly invert the arrival times to determine at least one formation characteristic of the inter-well region, wherein said at least one formation characteristic is selected from the group consisting of effective porosity, residual oil saturation, and connate water saturation.

24. The system of claim 23, wherein said first well has a fluid at a first salinity and wherein one or more monitoring locations are in a formation having a formation fluid at a second salinity different from said first salinity.

25. The system of claim 23, wherein said first well is an injector well.

26. The system of claim 23, wherein one or more monitoring locations are selected from the group consisting of an observation well, a production well, an exploratory well, and an appraisal well and combinations thereof.

27. The system of claim 23, wherein said ERA is permanently installed.

28. The system of claim 23, wherein said ERA is temporarily installed.

29. The system of claim 28, wherein said ERA is incorporated in a testing string.

30. The system of claim 23, wherein at least one electrical resistivity array is capable of monitoring the arrival of at least one front at one or more monitoring locations as a function of time.

31. The system of claim 30, wherein at least one electrical resistivity array is capable of monitoring the rate of change of water saturation for at least one saturation front.

32. The system of claim 31, further including means to develop a model of the time evolution of at least one front.

33. The system of claim 32, further including means to plot the time evolution of at least one saturation front.

34. The system of claim 30, wherein at least one electrical resistivity array (ERA) is capable of monitoring the arrival of at least one front as a function of time for different positions along said electrical resistivity array.

35. The system of claim 30, wherein at least one electrical resistivity array (ERA) is capable of monitoring the rate of change of water saturation as a function of time for different positions along said electrical resistivity array.

36. The system of claim 23, wherein one or more monitoring locations are temporarily installed for a time period sufficient to measure the movement of at least one front in said inter-well region.

37. The system of claim 36, wherein said first well is temporarily installed for a time period sufficient to measure the movement of at least one front in said inter-well region.

38. The system of claim 23, further comprising one or more additional sensors.

39. The system of claim 38, wherein one or more additional sensors are selected from the group consisting of salinity sensors, pressure sensors, 4D seismic sensors and combinations thereof.

* * * * *